S. Z. DE FERRANTI.
ELECTRIC WELDING MACHINE.
APPLICATION FILED FEB. 18, 1907.

972,838.

Patented Oct. 18, 1910.
4 SHEETS—SHEET 1.

Attest:
B. G. Phillips.
Edward N. Sarton

Inventor
Sebastian Z. de Ferranti
By Spear, Middleton, Donaldson & Spear
Attys.

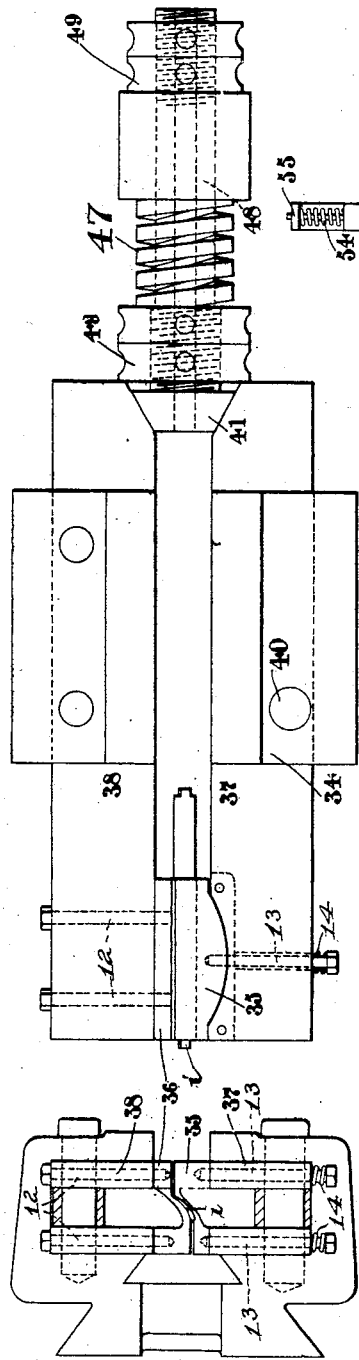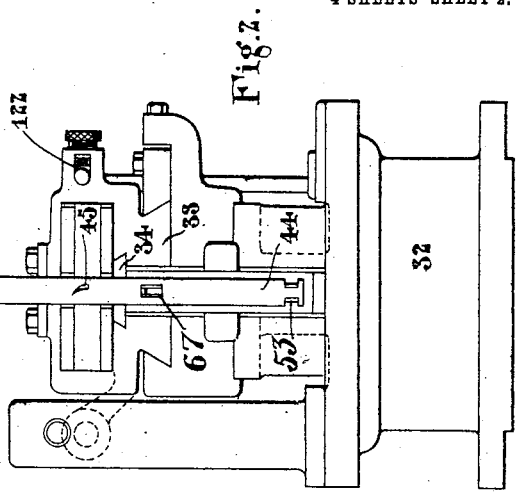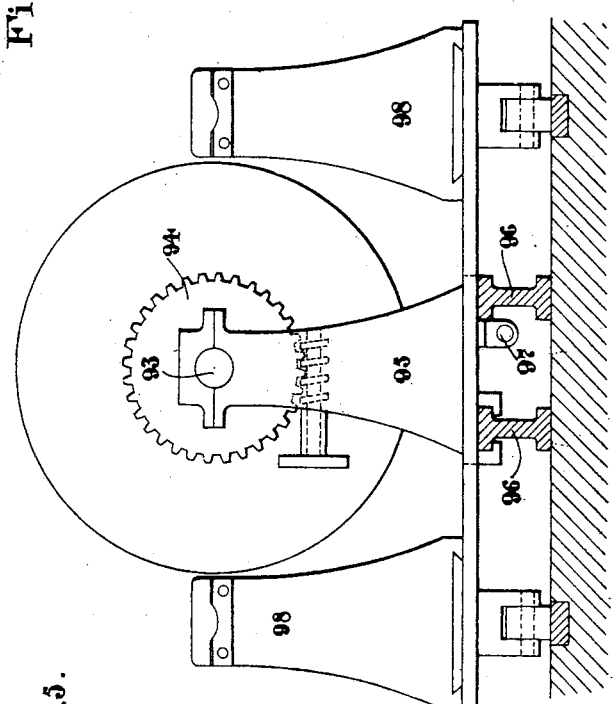

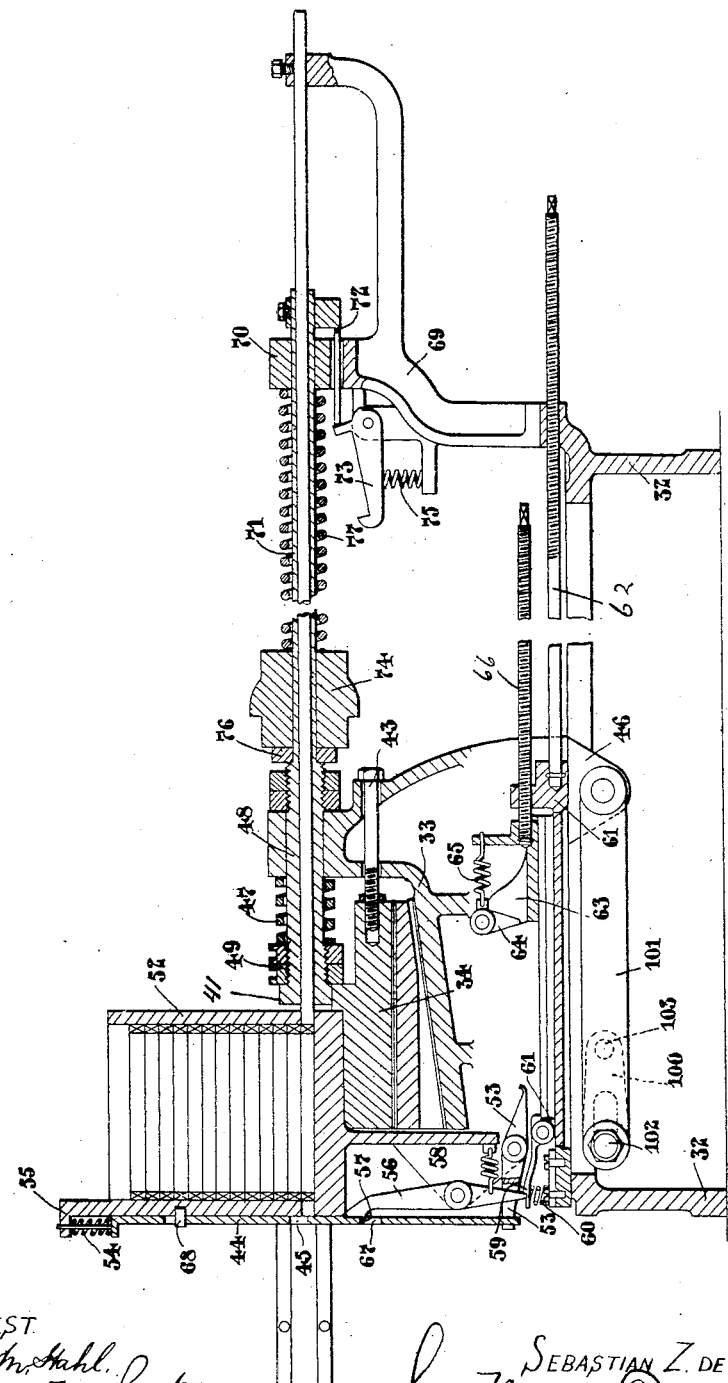

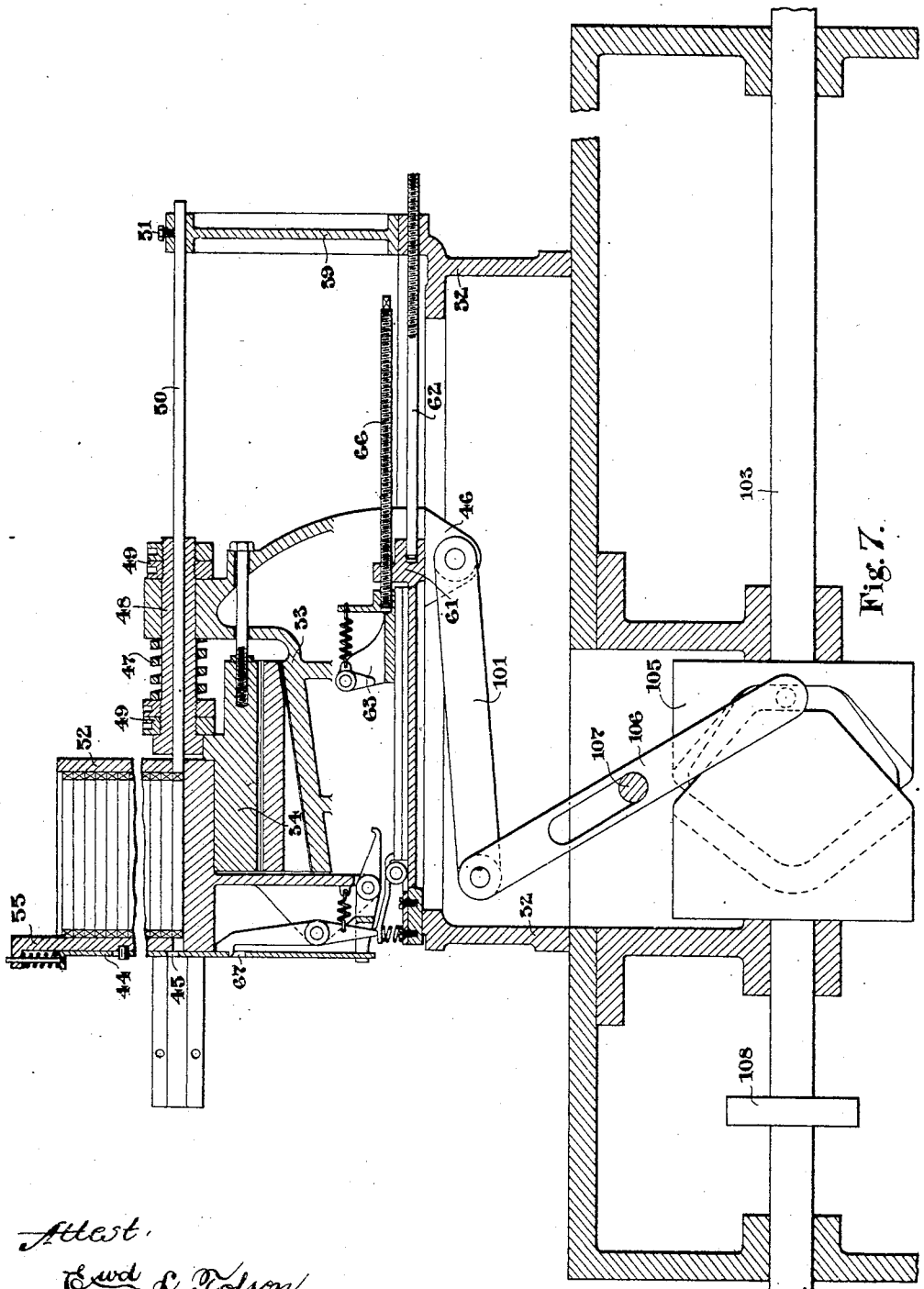

UNITED STATES PATENT OFFICE.

SEBASTIAN ZIANI DE FERRANTI, OF GRINDLEFORD BRIDGE, NEAR SHEFFIELD, ENGLAND.

ELECTRIC WELDING-MACHINE.

972,838.  Specification of Letters Patent.  Patented Oct. 18, 1910.

Original application filed December 15, 1905, Serial No. 291,933. Divided and this application filed February 18, 1907. Serial No. 358,048.

*To all whom it may concern:*

Be it known that I, SEBASTIAN ZIANI DE FERRANTI, a subject of the King of Great Britain and Ireland, formerly residing at 31 Lyndhurst road, Hampstead, in the county of London, but now of Grindleford Bridge, near Sheffield, England, have invented certain new and useful Improvements in Electric Welding-Machines, of which the following is a specification.

This invention relates to electric welding machines and has special reference to such machines as are used for welding turbine blades to the wheels, rings or drums carrying them.

In my U. S. Patent #906400, dated December 18, 1908, from the application of which the present application is a division, I have described methods by which turbine blades can be successfully welded on to the parts carrying them, and the object of the present invention is to provide means whereby the operation of electrically welding turbine blades to their carrying members can be performed automatically and with greater expedition than heretofore.

The invention consists in the improved forms of machines and the details thereof to be hereinafter described.

Figure 1:
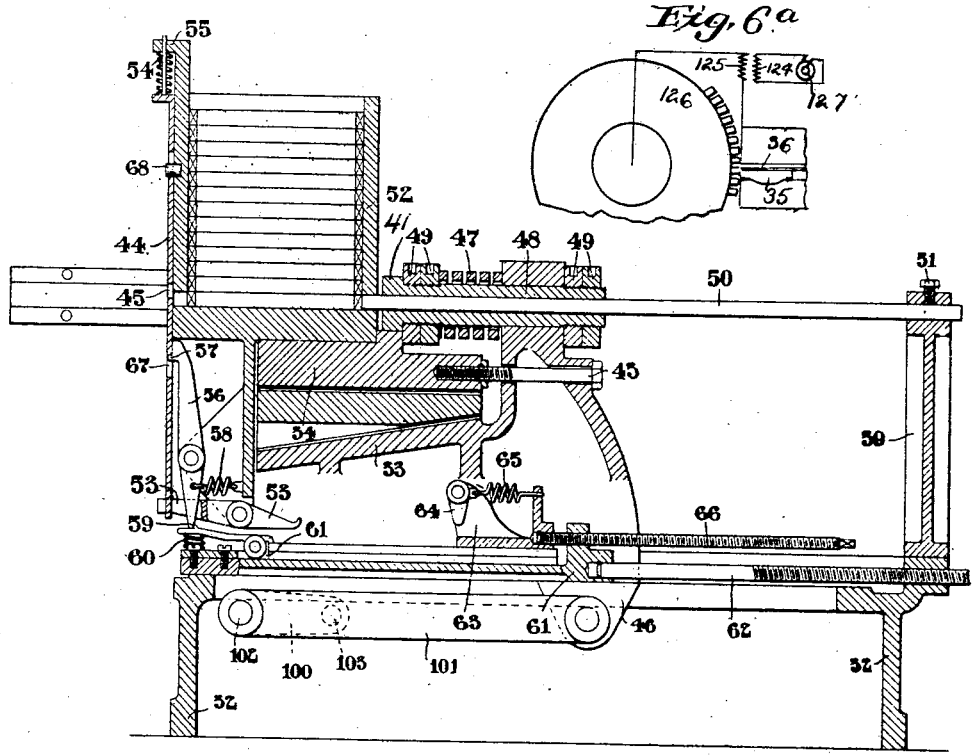

Referring now to the accompanying drawings which illustrate my invention and form part of my specification:—Figure 1 is a sectional elevation of a welding machine constructed according to my invention; Fig. 2 is an end elevation; and Fig. 3 a plan of the welding machine shown in Fig. 1; Fig. 4 is a plan, and Fig. 5 is an end elevation of the blade holding jaws of the welding machine shown in Figs. 1, 2, 3. Fig. 6 shows a sectional elevation of a welding machine provided with a device for imparting a hammer blow to the welding surfaces; Fig. 6ª shows a diagrammatic view of the welding circuits; Fig. 7 shows a modified form of drive to that shown in Fig. 1; Fig. 8 is a view of a duplex form of welding machine.

I wish it to be understood that in order to avoid undue complexity in the drawings, they are to a large extent of a diagrammatic nature.

In constructing a machine for welding blades according to my improved methods and one modification, I provide a base 32, Figs. 1 to 6, which carries the main slide, 33, mounted thereon. On the main slide 33, the auxiliary or welding slide 34, carrying the blade holding mechanism is disposed, the construction and operation of which will now be described. Detachable jaws 35 and 36 are fixed in the permanent jaws, 37 and 38, (Figs. 4 and 5) which are of large heat capacity, the jaw 36 being rigidly attached to the jaw 38 by means of the screws 12, while the jaw 35 is mounted on a jaw 37 by bolts 13, carrying springs 14. By attaching the jaw, 35, by means of centrally disposed bolts, 13, provided with springs, 14, an amount of freedom is obtained by this arrangement which facilitates the insertion of the blades. The permanent jaws 37 and 38 are both mounted on the auxiliary slide 34, the jaw 38 being rigidly attached thereto while the jaw 37 is rotatably mounted on the pin 40, so that the blade may be effectively clamped between the jaws on forcing apart the ends thereof by the insertion of a wedge 41, formed integrally with the threaded rod 48. The motion of the wedge 41 is derived from the reciprocating slide in a manner to be hereinafter described. The detachable jaws 35 and 36 which actually hold the blade $i$, are formed at the ends of the same angle as the end of the blade, holding it in such a manner that only the shank projects as shown in Fig. 4, while the other end of the blade abuts against a plate 44 Fig. 1. The operating ends of the detachable jaws 35 and 36 are adapted when the weld is being completed to be forced up against the carrying element, 126 to smooth the metal forced out from the weld, which would otherwise appear on the surface of the blade and spoil a clean path through the blades.

The welding slide, 34, which carries the permanent jaws 37 and 38, is adapted to have a small motion relatively to the main slide 33, the amount of which motion is adjustable by means of a screw 43. The main slide, 33, is reciprocated on the base 32, by means of a crank, 100, mounted on a crank shaft, 103 and actuating by means of the crank pin, 102 a connecting rod 101, attached to the lug 46, of the main slide, 33. In order to facilitate the insertion of the blade between the jaws 35 and 36, I cause the welding slide, 34 to lag behind the main slide 33 by means of a rod 120, the amount of retardation being adjusted by means of screws, 121, which regulate the amount of friction between spring pressed bearing pieces 122 and the rod 120. In some cases, I may actuate the connecting rod 101, Fig. 7, by means of a cam instead of a crank, especially in those circumstances where I desire that some parts of the travel of the main slide may be performed more quickly than others. A drive of any suitable type may be used to impart the required motion to the shaft 103.

Figure 3:
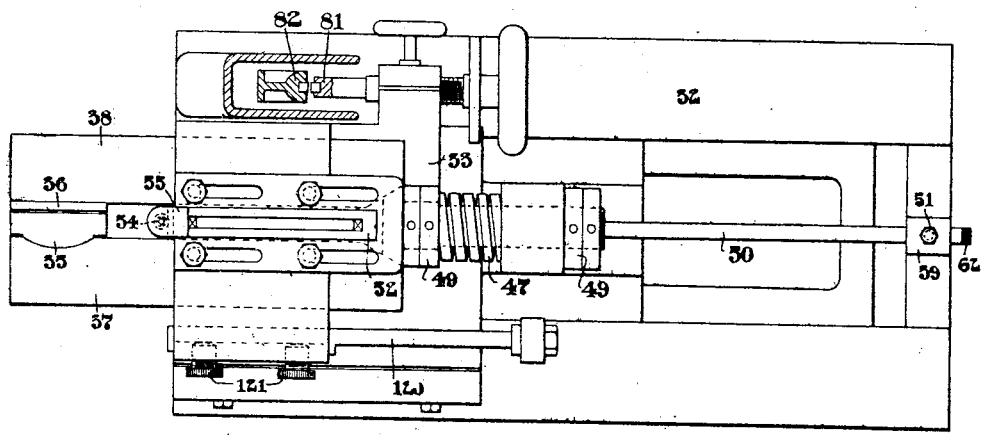

The main slide is connected to the welding slide preferably through a spring 47, mounted on the thread hollow pin 48, nuts 49 engaging with screwed portions of the pin 48, in order to adjust the tension in the spring 47. The end of the pin 48 is of tapered form to enter with a wedging action between the rear ends of the jaws 37 and 38 as shown in Figs. 3 and 4, the relative motion of the main and welding slides at the termination of the welding stroke causing the blades to be firmly clamped by the jaws and pressed against the wheel or other part to be welded. The tension of the spring 47 is preferably so adjusted that when the main slide carries the welding slide forward, the parts to be welded are gently but effectually pressed together. This enables the heating of the parts to be welded to take place gradually and prevents them being forced together before the welding temperature is reached.

A standard 39 is rigidly attached to the base plate 32 and carries a pusher rod 50, which passes through the hollow pin 48, before mentioned, the position of the end of the rod with respect to the standard 39 being adjustable by means of the screw 51. This rod 50, is adapted on the "in stroke" that is, the stroke on which welding does not take place to displace a blade from a magazine 52, attached to the welding slide, and into which magazine the finished blades have previously been deposited. The length of the rod is so adjusted with respect to the motion of the slide 33, that at the end of the instroke the blade lies between the detachable jaws, 35 and 36, with the shank projecting therefrom. A plate 44 is situated directly in front of the magazine, 52, and slidably mounted thereon, its motion being limited by a stop 68, and its lower end being adapted to engage with the forked end of a lever 53, rotatably mounted on the main slide 33. A spring 54 is inserted between the top end of the plate 44 and a projection 55, formed on the magazine 52, the compression of the spring always tending to return the plate 44 to its lowest position in which a clear passage is provided for the blade through the hole 45 in the plate. On the main slide 33, a lever 56 is also pivotally mounted, having a tooth or detent 57 on one of its arms adapted to engage with a recess or opening 67 in the plate 44, and hold it in such a position that the ends of the blade abut thereagainst. A spring 58 attached to the other arm of the lever 56, tends to keep the detent 57 yieldingly pressed against the plate 44. A hinged engaging member 59 having a spring 60 inserted between the forks, is rigidly attached to a slide 61, the position of which is adjusted with respect to the stroke of the main slide by means of a threaded rod 62. On the slide 61 a bracket 63 is slidably mounted, and carries a small bell crank lever 64, one arm of which is adapted to engage with the lever 53, while the other is attached to a spring 65. To the bracket 63 a threaded rod 66 is attached, for adjusting the position of the bracket with respect to the stroke of the main slide.

In operation the device acts as follows:— On the in stroke of the machine the transference of the blade to be welded from the magazine to a position between the jaws takes place. At the commencement of this stroke the lower end of the lever 56, comes in contact with the engaging member 59, the continued motion of the slide causing the disengagement of the detent 57, on the upper end of the lever from the plate 44. The expansion of the spring 54 compels the plate 44 to descend, so that a clear passage for the blade is provided through the hole, 45, the blade being then transferred to the welding jaws by the action of the pusher rod 50. Just at the end of the stroke and when the shrouding tag of the blade has cleared the plate 44, the lever, 53, engages with the bell crank 64, and is held in engagement therewith until the slide has traveled sufficiently far on the "out stroke" to allow the end of the pusher rod 50, which is projected through the hole at the end of the "in stroke" to be withdrawn sufficiently to clear the plate 44; at this point the motion of the lever 53 causes the plate 44 to move vertically upward and the detent 57 engaging with the hole 67, retains the plate 44 in that position after which the lever 53 springs clear of the bell crank 64. On the welding or out stroke of the machine the spring 65 allows the disengagement of the lever 53 and the bell crank 64, the spring 60, inserted between the jaws of the engaging member 59, allowing the lever 56 to slide over it. On the next stroke of the machine the above cycle of operations is repeated. The adjusting screws 62 and 66 allow the positions of the engaging member 59 and the bell crank, 64 to be adjusted for various sizes of blades.

In some cases when I desire to give a hammer blow to the welding slide after the parts have been sufficiently heated so as to impart an extra smooth finish to the welded surfaces, I substitute the bracket 69, Fig. 6, for the standard 39, in Fig. 1, this bracket 69 having a bearing 70 for the pusher rod 50, which is in this case considerably lengthened. The pin 48, has a hollow extension 71 which passes through one of the bearings 70 and carries a trigger piece 72 which is adapted to engage one arm of a catch lever 73, pivotally mounted on the bracket 69. A weight 74 is slidably mounted on the extension 71, of the hollow pin 48, having its surface so formed as to engage with and be retained by the hooked end of the catch lever 73, held normally in the path of the weight by means of a spring 75, a buffer 76, of any suitable material being interposed between the striking surfaces. A spring 77 is interposed between the bearing 70 and the weight. On the instroke of the machine, the spring 77 will be compressed by the backward motion of the main slide and the end of the weight 74, coming in contact with the hooked end of the lever 73, causes the latter to engage with the weight and retain the spring in its compressed position. The position of the trigger piece 72 is so adjusted that on the "out" or "welding" stroke of the machine when the parts to be welded have softened under the heating influence of the current and yielded a predetermined amount the weight is released by the engagement of the trigger finger 72 with the short arm of the bell crank 73, and a hammer blow is imparted to the welding slide which forces the jaws 35 and 36 against the wheel or ring and leaves an exceedingly smooth surface at the welded parts.

In Fig. 7 I have shown an arrangement in which the link, 101, is actuated from the shaft 103, by means of a lever 106, pivoted at 107. The lever 106, is actuated by the cam 105, the path of the cam being formed so as to provide a second slow motion while the blade to be welded is being registered in the jaws.

It will be understood from the above description that the blades to be welded after being punched and dressed are introduced in the magazine 52 which reciprocates along with the welding slide 34.

The arrangement of the welding circuit is illustrated in Fig. 6ª. The primary winding 124 of a transformer is connected up to any suitable source of electrical energy, such as a dynamo 127. One lead from the secondary winding 125, is connected to the welding machine and the other is connected to the carrying element 126. When the blade is pressed against the carrying element by the welding jaws, the circuit is completed and the current passing along the blade to the carrying element raises the temperature of the parts at the point of contact to a welding heat, the pressure between blade and the carrying element thereafter effecting the weld.

The member on which the blades are to be welded I preferably mount on a horizontal shaft 93, Fig. 8, which also carries the dividing wheel 94. The shaft 93 is rotatably mounted in a headstock, 95, which is adapted to be moved along the ways 96, by means of screw gear 97. Welding machines 98, such as I have already described are mounted on each side of the shaft 93 so as to be adjustable both longitudinally and transversely with respect to it, thereby allowing for different sizes of wheels and for the welding machines to act on different rings of the blades when this plan is applicable owing to the spacing and sizes of the blades to be dealt with. In other circumstances, however, the two heads may be welded onto the same ring each doing half of the circumference.

It will be evident that my invention is not limited in its scope to the precise machines hereinbefore described as it is obvious that many modifications may be made in the details thereof without exceeding the scope of my invention as defined in the appended claims.

Having now described my invention, what I claim as new and desire to secure by Letters Patent is:—

1. In a machine for attaching turbine blades to a carrying element and in combination, means for holding blades a magazine for blades means for transferring a blade from said magazine to said holding means, together with means including said holding means for attaching said blade to the carrying element, substantially as described.

2. In a machine for attaching turbine blades to a carrying element and in combination, means for holding blades, a magazine for blades means for transferring a blade from said magazine to said holding means, means for preventing said blade being displaced rearwardly during welding together with means for attaching said blade to said carrying element, substantially as described.

3. In a machine for attaching turbine blades to a carrying element and in combination, means for clamping blades, a magazine for blades means for transferring blades from said magazine to said clamping means, together with means including said clamping means for welding said blades to their carrying elements while held by the clamping means, substantially as described.

4. In a machine for attaching turbine blades to a carrying element and in combination, means for automatically clamping blades, a magazine for blades means for automatically transferring blades from said magazine to said clamping means, and means including said clamping means for welding said transferred blades to the carrying element, substantially as described.

5. In a machine for attaching turbine blades to a carrying element and in combination means for clamping blades, a magazine for blades means for transferring blades from said magazine to said clamping means, means for causing a clamped blade and the carrying element to contact, and means including said clamping means for attaching the blades to said carrying element, substantially as described.

6. In a machine for attaching turbine blades to their carrying elements and in combination, means for clamping the blades, a magazine for blades means for transferring the blades from said magazine to said clamping means, means for causing a clamped blade and the carrying element to be pressed together, and means including said clamping means for welding said blade to said carrying element, substantially as described.

7. In a machine for attaching turbine blades to a carrying element and in combination, means for clamping the blades, a magazine for blades means for transferring the blades from said magazine to said clamping means, means for causing said clamping means and the carrying element to come into operative relation and be pressed together, means including said clamping means for welding the contacting parts of the blades and carrying element, together with means for gradually increasing the pressure between the contacting surface as the welding operation progresses, substantially as described.

8. In a machine for attaching turbine blades to a carrying element, a magazine for blades, means for holding blades means for automatically and successively transferring the blades from said magazine to said holding means, and means including said holding means for attaching said blades to said carrying element, substantially as described.

9. In a machine for attaching turbine blades to a carrying element, means for holding a blade, a magazine for blades means for successively transferring blades from said magazine to said holding means, means for clamping said holding means, and means including said holding means for welding said transferred blades to said carrying element, substantially as described.

10. In a machine for attaching turbine blades to a carrying element, means for holding a blade, a magazine for blades means for successively transferring blades from said magazine to said holding means, means for opening said holding means when a blade is being transferred thereto, means for clamping said holding means on the transferred blades, and means including said holding means for attaching said clamped blade to said carrying element, substantially as described.

11. In a machine for attaching turbine blades to a carrying element, means for holding a blade, a magazine for blades, means for transferring a blade from said magazine to said holding means, and means including said holding means for attaching the transferred blade to said carrying element, substantially as described.

12. In a machine for attaching turbine blades to a carrying element, means for clamping blades, a magazine for the blades, means for transferring a blade from said magazine to said clamping means, and means including said holding means for welding the transferred blade to said carrying element, substantially as described.

13. In a machine for attaching turbine blades to a carrying element, means for clamping blades, a magazine for the blades, means for transferring a blade from said magazine to said clamping means, and abutment member for the transferred blade, means for displacing the abutment member while the blade is being transferred to said clamping means, together with means for welding said transferred blade to the carrying element, substantially as described.

14. In a machine for attaching turbine blades to a carrying element, means for clamping blades, a magazine for the blades, means for transferring a blade to said clamping means from said magazine, means for preventing rearward movement of the transferred blade in said clamping means in the clamped position, together with means for welding the transferred blade to said carrying element, substantially as described.

15. In a machine for attaching turbine blades to a carrying element, means for clamping blades, in combination with means for imparting a hammer blow to said clamping means, substantially as described.

16. In a machine for attaching turbine blades to a carrying element, a main slide, means for reciprocating said main slide, a welding slide, a resilient connection between said main and welding slides, blade clamping means on said welding slide, a magazine or holding blades on said welding slide, means for transferring a blade from said magazine to said clamping means, means for preventing rearward movement of the transferred blade in said clamping means, together with means for welding the transferred blade to the carrying element, substantially as described.

17. In a machine for attaching turbine blades to a carrying element, means for holding a blade, a magazine for containing a plurality of blades, means for automatically transferring a blade from said magazine to said holding means, and means including said holding means for attaching each forwarded blade to said carrying element, substantially as described.

18. In a machine for attaching turbine blades to a carrying element, means for holding a blade, a magazine for containing a plurality of blades, means for automatically and successively transferring the blades from said magazine to said holding means, means for automatically causing said transferred blades to be clamped in said holding means, and means including said holding means for automatically attaching said forwarded blade to said carrying element, substantially as described.

19. In a machine for attaching turbine blades to a carrying element, the combination of a slide, blade-holding means on said slide, means for reciprocating said slide, a spring-actuated hammer member, a retaining device for engaging the hammer on one stroke of said slide for compressing the spring of said hammer member together with means for disengaging the retaining device to permit the spring of said hammer member to impart a blow to said blade holding means, substantially as described.

20. In a machine for attaching turbine blades to a carrying element, a magazine for blades, means for displacing a blade from said magazine, and means for attaching said displaced blade to said carrying element, substantially as described.

21. In a machine for attaching turbine blades to a carrying element, a magazine for blades, means for displacing a blade from said magazine, and means for welding said displaced blade to said carrying element.

22. In a machine for attaching blades to a carrying element, means for holding blades, a magazine for the blades, a slide, means for reciprocating said slide, means for transferring a blade from said magazine automatically on one stroke of said slide to said holding means, means for automatically causing a blade to be clamped by said holding means, together with means including said holding means for welding said forwarded and clamped blade to said carrying element, substantially as described.

In testimony whereof, I affix my signature in presence of two witnesses.

SEBASTIAN ZIANI DE FERRANTI.

Witnesses:
ALBERT HALL,
WILLIAM HERBERT DONNER.